United States Patent
Uno et al.

[11] 3,850,530
[45] Nov. 26, 1974

[54] METHOD AND APPARATUS FOR MEASURING LIGHT WHICH FLICKERS

[75] Inventors: Naoyuki Uno; Katsuhiko Nomura, both of Kawagoe; Tadazumi Sakazaki, Tokyo; Koichiro Watanabe, Funabashi; Katsuhiko Miyata, Kawasaki; Fumio Urano, Wako, all of Japan

[73] Assignee: Asahi Kogaku Kogyo Kabushiki Kaisha, Tokyo, Japan

[22] Filed: Nov. 27, 1972

[21] Appl. No.: 309,780

[30] Foreign Application Priority Data
Dec. 1, 1971   Japan.............................. 46-97498

[52] U.S. Cl.................... 356/226, 354/31, 356/222, 250/208
[51] Int. Cl.............................................. G01j 1/44
[58] Field of Search................... 356/218, 222, 226; 250/208, 210; 330/149; 354/31, 60

[56] References Cited
UNITED STATES PATENTS
2,294,377   9/1942   Bierwirta....................... 250/220 C
3,550,013   12/1970   Gurol................................ 330/149

Primary Examiner—Ronald L. Wibert
Assistant Examiner—Conrad Clark
Attorney, Agent, or Firm—Steinberg & Blake

[57] ABSTRACT

A method and apparatus capable of measuring light which has a flickering component. The light which is to be measured is received simultaneously by a pair of photosensitive units each of which provides a signal having an AC component corresponding to the flickering light component and a DC component corresponding to the steady light component. One of the signals produced by one of the photosensitive units is electrically altered in such a way that its AC component will cancel the AC component of the other signal when arithmetically combined therewith. Then the arithmetic combining of the signals is carried out so that the AC components will cancel each other, thus leaving only a DC output which can then be used for purposes such as operating a light meter or participating in the control of the operation of a camera shutter.

9 Claims, 12 Drawing Figures

OUTPUT WAVE FORMS AT $P_1$

OUTPUT WAVE FORMS AT $P_2$

OUTPUT WAVE FORMS AT $P_1$

OUTPUT WAVE FORMS AT F

EXIT

METHOD AND APPARATUS FOR MEASURING LIGHT WHICH FLICKERS

BACKGROUND OF THE INVENTION

The present invention relates to light measuring methods and apparatus.

Such methods and apparatus are of particular utility in connection with the operation of cameras. In order to provide proper film exposure it is necessary to carry out accurate light measurement by way of using, for example, an exposure meter, and it is preferred that the intensity of the light at the object to be photographed is measured at the instant when the film is exposed so that the control of the film exposure will be determined in accordance with the accurate measurement of light at the instant when the exposure is made. In single lens reflex cameras where light is measured after it travels through the objective of the camera, as by utilizing a photosensitive element situated in the path of the viewfinder light, the path of light travelling to the photosensitive element is necessarily interrupted at the moment when the film is exposed. Thus, with such a system the light at the object to be photographed is measured immediately before the shutter is opened, and the exposure time is controlled in connection with operation of the shutter in accordance with the measured light or in accordance with the value of the light intensity temporarily stored by a suitable means. When regulating the exposure of the film based upon a light measurement value obtained just prior to opening of the shutter, however, there is often an erroneous exposure because of a variation in the lighting conditions in the short period after termination of light measurement and prior to actual opening of the shutter. Thus, the light measuring operation should be carried out at a moment of time as close as possible to the instant when the shutter is opened, in order that the light intensity at the object which is photographed may be measured in such a way as to equal as closely as possible the light which is received by the film during actual exposure.

There is thus an important requirement to provide a light measuring structure which can be operated, in connection with the camera mechanism, in such a way that the light measuring operation is carried out immediately before the opening of the shutter between the time when the operator starts to depress the shutter-tripping plunger and the interruption of the light received by the photosensitive element. With such light measuring structure the photosensitive element which converts the photo-signal into an electrical signal should have an extremely rapid response to light since the time required for the light measuring operation is extremely short.

Photosensitive elements such as a selenium cell, a solar battery, or a photo diode may be used as a photosensitive element which meets this latter requirement of having a rapid response to light.

These photosensitive elements used in measuring light even in a device which is not operatively connected with the camera mechanism should also have the rapid response-to-light characteristic.

In addition, it is known that exposures are made not only under conditions of natural light but also under conditions where there is artificial illumination.

When using such rapid response-to-light types of photosensitive elements, there is a substantial error in light measuring under conditions where the object to be photographed is illuminated by a light source which has not only a steady light component but also a flickering light component. For example light from a fluorescent lamp has such a flickering component. With light which has a flickering component the light intensity varies either periodically or non-periodically, and the variation is so rapid that there may indeed be a substantial error in an exposure even when there is only a short duration between the instant when light measurement is completed and the instant when the shutter is opened. Thus, under the latter conditions there will be a wide variation in the results of the light measurement depending upon the instantaneous condition of the light intensity at the object to be photographed with a flickering light source, so that for practical purposes light measurement under these latter conditions is not preferred.

SUMMARY OF THE INVENTION

It is accordingly a primary object of the present invention to provide a light measuring method and apparatus which will enable light measurement to be carried out under conditions where the source of light provides light having a flickering component with the results achieved under these conditions being as fully accurate as when light is measured under conditions where only a steady light is provided.

In particular it is an object of the present invention to provide a method and apparatus which make it possible to eliminate the undesirable influence of the flickering light while still achieving a fully accurate light measurement.

Yet another object of the present invention is to provide a method and apparatus which are particularly suitable for use with cameras either for the purpose of indicating light at a light meter or for the purpose of controlling the operation of a shutter.

In accordance with the method of the invention light which has flickering and steady components is simultaneously received by a pair of photosensitive means each of which provides a signal having an AC component corresponding to the flickering light component and a DC component corresponding to the steady light component. One of these signals is altered into a form according to which the AC component thereof when arithmetically combined with the AC component of the other signal will produce cancelling of these AC components. Then the altered and non-altered signals are arithmetically combined so as to eliminate the AC components and achieve in this way only a DC output to be subsequently used for purposes such as indicating light intensity with a light meter or controlling the operation of a camera shutter.

With the apparatus of the invention there are a pair of photosensitive means for simultaneously receiving light from the source which has both steady and flickering components, and the pair of photosensitive means each respond to the received light for providing an output signal having an AC component corresponding to the flickering light component and a DC component corresponding to the steady light component. An electrical signal-altering means is electrically connected with one of the photosensitive means for altering the output signal thereof into a form according to which the AC component of the altered signal will cancel the AC component of the non-altered signal when the latter AC components are arithmetically combined. An electrical signal-combining means for arithmetically combining the altered and non-altered signals receives both the altered and the non-altered signals so as to eliminate the AC components thereof providing in this way only a DC output which can be used for purposes such as light measurement or shutter control in a camera. In this way influence of the flickering light is eliminated.

BRIEF DESCRIPTION OF DRAWINGS

The invention is illustrated by way of example in the accompanying drawings which form part of this application and in which.

DESCRIPTION OF PREFERRED EMBODIMENTS

Figure 1A:
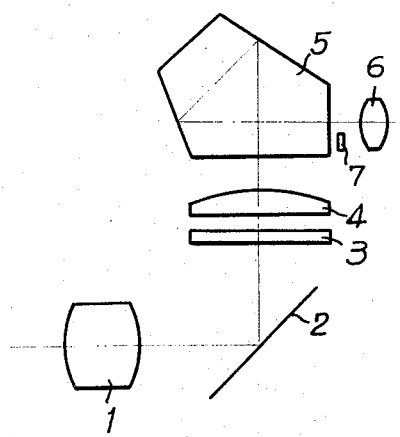
FIG. 1A is a schematic side view illustrating the manner in which light is received in a single lens reflex camera.

Referring first to FIG. 1A, there is schematically illustrated therein an internal light measuring system in a single lens reflex camera. Thus, the light which enters through the objective 1 from the object to be photographed is reflected by the tiltable mirror 2 up to a focal plate 3 so that the image of the object to be photographed is focussed thereon. Situated over the focal plate 3 is a Fresnel lens arranged so that the image focussed on the focal plate 3 can be visually observed through the Fresnel lens 4 as well as through the eyepiece lens 6 with the pentaprism 5 interposed between the components 4 and 6.

Figure 1B:
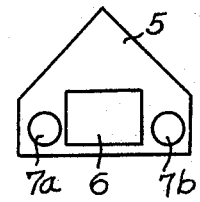
FIG. 1B is a view of the upper viewfinder portion of FIG. 1A as seen from the right of FIG. 1A.

As is shown in FIG. 1A, a photosensitive assembly 7 is provided for receiving the light, and FIG. 1B shows that the photosensitive assembly includes a pair of photosensitive means 7a and 7b and respectively situated on opposite sides of the optical axis of the eyepiece lens 6 with the operative surfaces thereof directed toward the light exit surface of the pentaprism 5. Thus, the light from the object to be photographed is simultaneously received by the pair of photosensitive means 7a and 7b.

Figure 2A:
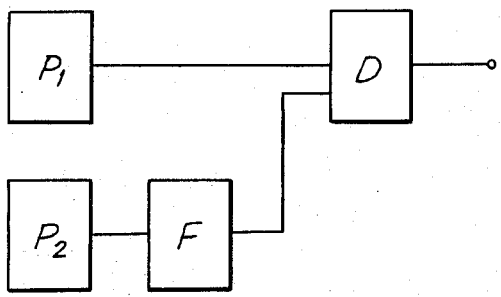
FIG. 2A is a schematic block diagram illustrating one possible method and apparatus according to the invention capable of being used with the arrangement shown in FIGS. 1A and 1B.

Referring now to FIG. 2A, the block diagram thereof illustrates how the important components of the method and apparatus of the invention operate to bring about the desired results. The pair of photosensitive means 7a and 7b are respectively illustrated by the blocks $P_1$ and $P_2$. The pair of photosensitive means, assuming that the exposure is made under conditions where the light has both a flickering and a steady component, will provide outputs each of which has an AC component, corresponding to the flickering light component, and a DC component, corresponding to the steady light component.

A signal-altering means is operatively connected electrically with one of the photosensitive means to alter the signal output thereof. In the case of FIG. 2A, it will be seen that the output signal from the photosensitive means or light-receiving station $P_2$ is altered by the signal-altering means F in the form of a suitable filter circuit, while the output signal from the other photosensitive means $P_1$, or in other words the other light-receiving station, is not altered. The signal-altering means F in the form of a filter circuit operates in a well known manner to block the DC component of the signal, while permitting only the AC component to pass. The altered and non-altered signals are then received by a signal-combining means D which in the illustrated example takes the form of a differential amplifier, and in the differential amplifier the pair of AC components of the pair of signals will cancel each other so that the output from the amplifier D will be effectively stabilized.

Figure 2B:
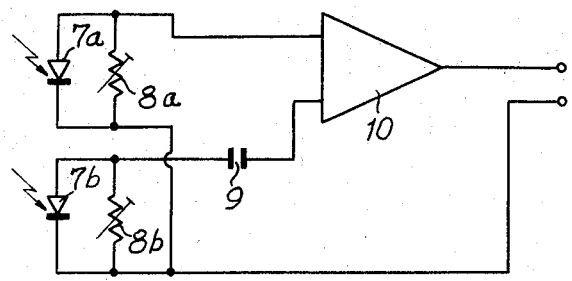
FIG. 2B is an electric wiring diagram showing details of the arrangement shown in the block diagram of FIG. 2A.

Referring now to FIG. 2B, the circuit diagram which corresponds to the block diagram of FIG. 2A shows that the pair of photosensitive means 7a and 7b are respectively connected operatively to a pair of variable resistors 8a and 8b. These resistors are provided for the purpose of sensitivity regulation and are each located across the output terminals of the particular light receiving station or photosensitive means to which it is connected. Thus, the variable resistor 8a is connected across the output terminal of the photosensitive means 7a while the variable resistor 8b is connected across the output terminals of the photosensitive means 7b.

As is apparent from a comparison of FIGS. 2A and 2B, in the example of FIG. 2B the filter means F takes the form of a capacitor 9 which forms the filter circuit or signal-altering means. The differential amplifier D of FIG. 2A is represented by the differential amplifier means 10 of FIG. 2B. This differential amplifier means 10 may take any one of various known differential amplifier circuits.

Figure 3A:
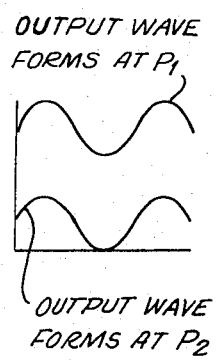
FIGS. 3A–3C are respectively graphs showing wave forms at various stages in the operation of the structure of FIGS. 2A and 2B.
Figure 3B:
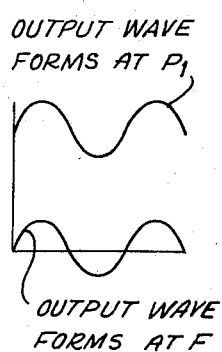
Figure 3C:
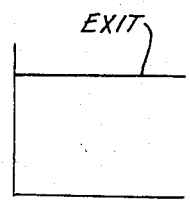

FIGS. 3A–3C illustrate how the method and apparatus illustrated in FIGS. 2A and 2B operate. Thus, it will be seen from the graph of FIG. 3A the output signals from the pair of photosensitive means $P_1$ and $P_2$ (or 7a and 7b) respectively have the illustrated wave forms which represent their AC components. The DC components are in the form of simple horizontal lines which are not illustrated in FIG. 3A for the sake of clarity.

FIG. 3B illustrates the AC wave forms respectively in the signals at the output of the photosensitive means $P_1$ and the signal-altering means F. In other words the lower wave form shown in FIG. 3B represents the output of the filter means F after the DC component has been blocked.

As a result of the action of the signal-combining means D the differential amplifier means 10 which forms the signal-combining means D subtracts the equal AC signal components from each other so that there remains only an output as shown in FIG. 3C. This output is the DC component remaining from the output signal of the photosensitive means $P_1$.

Figure 4:
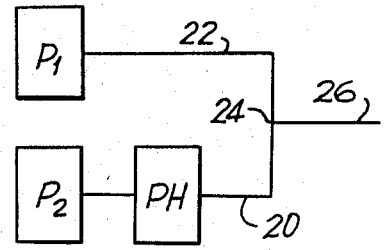
FIG. 4 is a block diagram of another embodiment of a method and apparatus according to the invention.

Referring now to FIG. 4, another embodiment of the invention is illustrated therein. With this embodiment the same pair of photosensitive means $P_1$ and $P_2$ receive the light and respectively provide output signals each of which has the AC and DC components referred to above. With this embodiment, however, the output signal from the photosensitive means $P_2$ is acted upon by a signal-altering means PH in the form of a phase inverter means which serves to invert the AC component of the output signal of the photosensitive means $P_2$. The output from the signal-altering means or phase inverter means PH is received by a conductor 20 while the output from the photosensitive means $P_1$ is received by a conductor 22. These conductors are connected to a common junction 24 which serves in this case as the signal-combining means where the altered and non-altered signals are combined. At the junction 24 the inverted and non-inverted AC components combine together so as to cancel each other by becoming superimposed one upon the other, and thus at the conductor 26 there is only a DC output corresponding to the measured light without the influence of the flickering component.

Figures 4A, 4B, 4C, 4D:
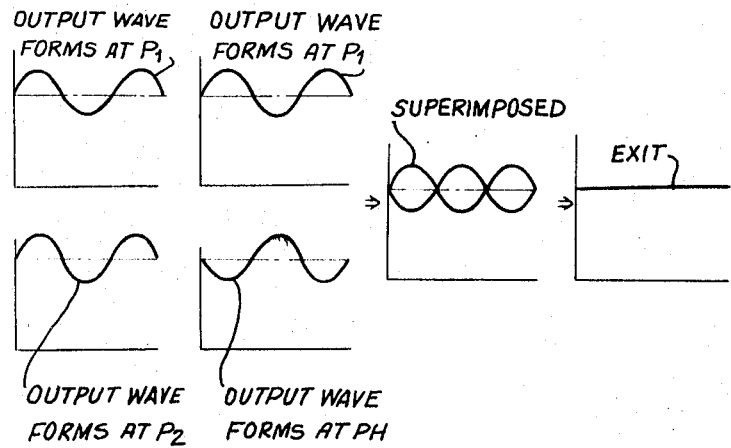
FIGS. 4A–4D illustrate wave forms at various stages in the operation of the embodiment of FIG. 4.

Referring to FIGS. 4A–4D, it will be seen that the output signals of the pair of photosensitive means $P_1$ and $P_2$ are illustrated one above the other in FIG. 4A, the AC components of the signals being shown. In FIG. 4B, it will be seen that the output signal from the photosensitive means $P_1$ remains unchanged. However at the lower part of FIG. 4B the output of the signal-altering means PH is shown, so that the lower AC component illustrated in FIG. 4A has a phase-inverted condition as illustrated at the lower part of FIG. 4B.

FIG. 4C illustrates how the altered and non-altered signals are combined at the junction 24 which forms the signal-combining means. At this part of the structure the signals are superimposed so that the inverted and non-inverted AC components cancel each other in the manner illustrated in FIG. 4C.

The result is that at the conductor 26 there is only a DC signal as illustrated in FIG. 4D.

Thus, with the method and apparatus of the invention a pair of signals which are equal are obtained by measuring the light intensity with the pair of photosensitive means 7a and 7b, inasmuch as the pair of photosensitive means 7a and 7b are situated at equal positions with respect to the lightexit surface of the pentaprism 5 in the single lens reflex camera schematically represented in FIGS. 1A and 1B. As is apparent from FIG. 1B, the eyepiece lens 6 is aligned with the space between the pair of photosensitive means 7a and 7b.

The two output signals from the pair of photosensitive means 7a and 7b are regulated, as shown in FIG. 2B, by the variable resistors 8a and 8b which are provided for the purpose of sensitivity regulation, and in this way the output levels of the two signals are rendered different from each other, as illustrated in FIG. 3A.

Thus, assuming that the object to be photographed is illuminated with a light source having not only a steady light component but also a flickering light component, then the wave forms shown in FIG. 3A are achieved corresponding to the flickering light component, and of course the same is true of the wave forms illustrated in FIG. 4A. The variable resistors 8a and 8b are adjusted so that in the case of FIG. 2B the output of the photosensitive means 7b is lower than the output of the photosensitive means 7a, and it is this output of the photosensitive means 7b which reaches the differential amplifier means D with the AC form shown at the lower part of FIG. 3B after the DC component thereof has been blocked by the capacitor 9 which forms the filter circuit F. The output from the photosensitive means 7a is applied directly to the differential amplifier means 10, so that the differential amplifier means 10 provides a stabilized output illustrated in FIG. 3C resulting from subtraction of the AC components of both signals, thus leaving only the DC component of the output signal of the photosensitive means 7a as the stabilized signal used for light measurement or shutter control.

The output of the filter circuit means F is always an AC signal which is symmetrical with respect to the zero level of voltage in accordance with the flicker period of the light source while the output of the light receiving station of the photosensitive means $P_1$ is obtained in the form of a superimposed signal derived both from the AC component and DC component according to the light intensity of the object to be photographed. Therefore, the stabilized output of the differential amplifier means D corresponds to a DC signal in accordance with the light intensity of the object to be photographed which has been obtained by eliminating the AC components of the two signals.

In the embodiment of FIG. 4, the output signal from either one of the photosensitive means, in the illustrated example the photosensitive means $P_2$, is inverted by the phase inverter means PH and the opposed AC components are superimposed so that the final output signal is according to light intensity of the object to be photographed, as was the case with the other embodiment of the invention, with both embodiments eliminating any adverse influence from the flicker characteristic of the light source.

Thus, with the present invention, as is apparent from the above description and drawings, either one of the outputs of the pair of photosensitive means which simultaneously receive light from the object to be photographed is altered in such a way that the AC component (the oscillating component of the output signal in accordance with the variation and light intensity of the object to be photographed resulting from the flicker characteristic of the light source) is transmitted, in the case of FIGS. 2A and 2B, or is phase-inverted, in the case of FIG. 4, and the altered and non-altered signals have their AC components arithmetically combined by subtracting them in the case of FIGS. 2A and 2B and adding them in the case of FIG. 4, so as to achieve an accurate light measurement in both cases without any adverse influence from the flickering component of the light, while using photosensitive elements of rapid response-to-light type for measuring the light intensity of the photographed object under conditions where the light source provides illumination which has a flicker component. Thus, the output signal achieved with the method and apparatus of the invention may be used as the input to an exposure meter or as the input to an automatic electrical shutter-control circuit to bring about a photographic operation which is both rapid and reliable.

What is claimed is:
1. In a method for measuring light which is present at an object to be photographed and which has flickering and steady components, the steps of simultaneously receiving said light in an identical manner at a pair of substantially identical photosensitive means while positioning the pair of photosensitive means substantially identically with respect to said light and providing with said pair of photosensitive means a pair of substantially identical signals, respectively, each having an AC component corresponding to the flickering light component and a DC component corresponding to the steady light component, electrically altering either one of said signals into a form according to which the AC component thereof when arithmetically combined with the AC component of the other signal will produce cancelling of the AC components of both signals, and then arithmetically and simultaneously combining the altered and non-altered signals for eliminating said AC components and providing only a DC output to be subsequently used for purposes such as indicating light intensity with a light meter or controlling the operation of a camera shutter, so that by elimination of the AC components the influence of the flickering light on the light measurement is eliminated.

2. In a method as recited in claim 1 and wherein the altering of said one signal is carried out by filtering the latter signal to transmit only the AC component thereof while the AC components of both signals are then arithmetically combined by electrically subtracting the AC components from each other whereby the resulting output is formed by the DC component of said other signal.

3. In a method as recited in claim 1 and wherein the altering of the AC component of said one signal is carried out by phase-inversion thereof while the arithmetic combining of said AC components is brought about by adding the non-inverted and inverted AC components.

4. In a method as recited in claim 3 and wherein the inverted and non-inverted AC components are added by superimposing them upon each other.

5. In a light-measuring apparatus for receiving light which is present at an object to be photographed, a pair of substantially identical photosensitive means positioned with respect to each other for simultaneously receiving the same light input from light which is at the object to be photographed and which has both steady and flickering components, said pair of photosensitive means respectively responding to said received light for providing identical output signals each having an AC component corresponding to the flickering light component and a DC component corresponding to the steady light component, electrical signal-altering means electrically connected with either one of said photosensitive means for altering the output signal thereof into a form according to which the AC component of the altered signal will cancel the AC component of the non-altered signal when the latter AC components are arithmetically combined, and electrical signal-combining means for arithmetically and simultaneously combining the altered and non-altered signals for eliminating the AC components thereof so that only a DC output is provided to be used for purposes such as light measurement or shutter control in a camera, whereby the influence of the flickering light is eliminated.

6. The combination of claim 5 and wherein said electrical signal-altering means is a filter means for transmitting only the AC component of the altered signal, said electrical signal-combining means being a differential amplifier means for subtracting the AC components of the two signals from each other whereby only the DC component of the non-altered signal forms the output to be used for purposes such as light-measurement or shutter control.

7. The combination of claim 6 and wherein a pair of variable resistor means are respectively connected electrically with said pair of photosensitive means for providing different output levels for the signals produced by said pair of photosensitive means.

8. The combination of claim 6 and wherein said filter means is in the form of a capacitor.

9. The combination of claim 5 and wherein said electrical signal-altering means is a phase-inverter means for providing a phase-inversion of the AC component of said signal of said one photosensitive means, and said signal-combining means including conductors receiving the outputs from said phase-inverter means and from the photosensitive means whose signal is not altered and having a common junction where the AC signals are superimposed to be added together after phase-inversion of the AC component of said one signal.

* * * * *